United States Patent
Miyoshi et al.

(10) Patent No.: US 8,737,246 B2
(45) Date of Patent: May 27, 2014

(54) WIRELESS TRANSMISSION APPARATUS AND PRECODING METHOD

(75) Inventors: Kenichi Miyoshi, Kanagawa (JP); Megumi Ichikawa, legal representative, Kanagawa (JP); Yoshiko Saito, Kanagawa (JP); Shinsuke Takaoka, Kanagawa (JP); Daichi Imamura, Kanagawa (JP); Seigo Nakao, Kanagawa (JP); Fumiyuki Adachi, Miyagi (JP)

(73) Assignee: Panasonic Corporation, Osaka (JP)

( * ) Notice: Subject to any disclaimer, the term of this patent is extended or adjusted under 35 U.S.C. 154(b) by 47 days.

(21) Appl. No.: 13/202,747

(22) PCT Filed: Feb. 23, 2010

(86) PCT No.: PCT/JP2010/001201
§ 371 (c)(1),
(2), (4) Date: Aug. 22, 2011

(87) PCT Pub. No.: WO2010/098078
PCT Pub. Date: Sep. 2, 2010

(65) Prior Publication Data
US 2012/0014279 A1    Jan. 19, 2012

(30) Foreign Application Priority Data
Feb. 24, 2009 (JP) ................................ 2009-041266

(51) Int. Cl.
*G08C 15/00*    (2006.01)

(52) U.S. Cl.
USPC ............................ 370/252; 370/254; 370/334

(58) Field of Classification Search
USPC ....................................................... 370/252
See application file for complete search history.

(56) References Cited

U.S. PATENT DOCUMENTS 8,121,212 B2 *   2/2012   Kwon et al. ................... 375/267
8,351,544 B2 *   1/2013   Mondal et al. ................ 375/299
(Continued)

FOREIGN PATENT DOCUMENTS

| CN | 101366304 | 2/2009 |
| JP | 2868012 | 12/1998 |
| JP | 2008-306713 | 12/2008 |

OTHER PUBLICATIONS

International Search Report dated Apr. 6, 2010.
F. Adachi, et al., "Shuhasu Sentakusei Channel ni Okeru MIMO Channel Yoryo no Kosatsu" ("Study on MIMO Channel Capacity in A Frequency-selective Channel"), The Institute of Electronics, Information and Communication Engineers, Mar. 5, 2008, pp. S-7 to S-8, with partial translation.

(Continued)

*Primary Examiner* — Gregory Sefcheck
*Assistant Examiner* — Daniel Mitchell
(74) *Attorney, Agent, or Firm* — Dickinson Wright PLLC

(57) ABSTRACT

A wireless transmission apparatus able to reliably increase outage capacity according to the state of a propagation path. This apparatus is a wireless transmission apparatus (100) which transmits a plurality of streams to a wireless reception apparatus; wherein a time/space allocation determining unit (107) determines the spatial multiplex stream number based on the desired multipath number and the number of reception antenna ports of the wireless reception apparatus, said desired multipath number being calculated based on the detected multipath number, the number of reception antenna ports, and the desired error rate for the plurality of streams; a stream dividing unit (109) divides the transmission data into a plurality of streams of that spatial multiplex stream number; a transmission weight calculation unit (108) calculates a transmission weight based on the desired multipath number, spatial multiplex stream number, and a channel estimation value; and a time precoding unit (1103) and a spatial precoding unit (111) use the transmission weight to precode the plurality of streams.

6 Claims, 16 Drawing Sheets

(56) References Cited

U.S. PATENT DOCUMENTS

| | | | |
|---|---|---|---|
| 8,358,714 B2* | 1/2013 | Walton et al. | 375/267 |
| 2004/0002364 A1* | 1/2004 | Trikkonen et al. | 455/562.1 |
| 2005/0123138 A1* | 6/2005 | Abe et al. | 380/255 |
| 2005/0249304 A1* | 11/2005 | Takano et al. | 375/267 |
| 2007/0297529 A1* | 12/2007 | Zhou et al. | 375/267 |
| 2008/0108310 A1* | 5/2008 | Tong et al. | 455/69 |
| 2008/0153428 A1* | 6/2008 | Han et al. | 455/69 |
| 2008/0285524 A1 | 11/2008 | Yokoyama | |
| 2008/0291851 A1 | 11/2008 | Guthy | |
| 2009/0156227 A1* | 6/2009 | Frerking et al. | 455/455 |
| 2012/0275416 A1 | 11/2012 | Yokoyama | |

OTHER PUBLICATIONS

A. Ganesan, et al., "A Virtual MIMO Framework for Multipath Fading Channels," Signals, Systems, and Computers, vol. 1, 2000, pp. 537-541.

A. F. Molisch, et al., "Measurement of the capacity of MIMO systems in frequency-selective channels," Vehicular Technology Conference, vol. 1, Spring 2001, pp. 204-208.

G. J. Foschini, et al., "On Limits of Wireless Communications in a Fading Environment when Using Multiple Antennas," Wireless Personal Communications, 1998, pp. 311-335.

* cited by examiner

| PMI | DESIRED NUMBER OF MULTIPLE PATHS Lreq | SPACE PRECODING MATRIX W(s) | TIME PRECODING MATRIX W(t) |
|---|---|---|---|
| 0 | 1 | W(s1) | W(t1) |
| 1 | 1 | W(s2) | W(t1) |
| 2 | 2 | W(s2-1) | W(t2-1) |
| 3 | 2 | W(s2-1) | W(t2-2) |
| 4 | 2 | W(s2-2) | W(t2-1) |
| 5 | 2 | W(s2-2) | W(t2-2) |
| 6 | 3 | W(s3-1) | W(t3-1) |
| 7 | 3 | W(s3-1) | W(t3-2) |
| 8 | 3 | W(s3-1) | W(t3-3) |
| 9 | 3 | W(s3-2) | W(t3-1) |
| 10 | 3 | W(s3-2) | W(t3-2) |
| 11 | 3 | W(s3-2) | W(t3-3) |
| 12 | 3 | W(s3-3) | W(t3-1) |
| 13 | 3 | W(s3-3) | W(t3-2) |
| 14 | 3 | W(s3-3) | W(t3-3) |

FIG.11

| PMI | NUMBER OF MULTIPLEXING STREAMS Nmux | SPACE PRECODING MATRIX W(s) | TIME PRECODING MATRIX W(t) |
|---|---|---|---|
| 0 | 2 | W(s1) | W(t1) |
| 1 | 2 | W(s2) | W(t1) |
| 2 | 4 | W(s2-1) | W(t2-1) |
| 3 | 4 | W(s2-1) | W(t2-2) |
| 4 | 4 | W(s2-2) | W(t2-1) |
| 5 | 4 | W(s2-2) | W(t2-2) |
| 6 | 6 | W(s3-1) | W(t3-1) |
| 7 | 6 | W(s3-1) | W(t3-2) |
| 8 | 6 | W(s3-1) | W(t3-3) |
| 9 | 6 | W(s3-2) | W(t3-1) |
| 10 | 6 | W(s3-2) | W(t3-2) |
| 11 | 6 | W(s3-2) | W(t3-3) |
| 12 | 6 | W(s3-3) | W(t3-1) |
| 13 | 6 | W(s3-3) | W(t3-2) |
| 14 | 6 | W(s3-3) | W(t3-3) |

FIG. 13

WIRELESS TRANSMISSION APPARATUS AND PRECODING METHOD

TECHNICAL FIELD

The present invention relates to a radio transmission apparatus and a precoding method.

BACKGROUND ART

In the recent years, as a technique to enable a high capacity data communication, a MIMO (Multiple-Input Multiple-Output) system is attracting attention. In the MIMO system, a radio transmission apparatus spatially multiplexes and sends transmission data (stream) from each of a plurality of transmitting antenna ports, and a radio receiving apparatus receives receiving data in which a plurality of transmission data is mixed by spatially separating it into original transmission data on a transmission path (e.g. see non-patent literature 1).

In the MIMO system, in a case where the number of transmitting antenna ports is Ntx and the number of receiving antenna ports is Nrx, the number of streams that can be multiplexed can be obtained by following equation 1.

[1]

$$\min(Ntx, Nrx) \qquad \text{Equation 1}$$

Here, function min(x, y) is a function that returns a smaller value of x and y. That is, the number of streams that can be multiplexed is a smaller one of the number of transmitting antenna ports Ntx and the number of receiving antenna ports Nrx.

Note that, in the MIMO system, in a case where a transmission bandwidth is broadened by an higher data transmission rate and a multipath occurs, typically, a multipath environment of each stream is processed by being converted to a single-path environment (i.e. the number of paths being 1) by using an OFDM (Orthogonal Frequency Division Multiplexing), etc.

Further, as an extension scheme of the MIMO system, in a case where the number of transmitting antenna ports is greater than the number of receiving antenna ports, a scheme in which the number of streams is increased by using the multipath generated on the transmission path is proposed (e.g. see non-patent literature 2).

Specifically, in a case where the number of transmitting antenna ports is Ntx, the number of receiving antenna ports is Nrx, and the number of paths is M, the number of streams that can be multiplexed can be obtained by following equation 2.

[2]

$$\min(Ntx, Nrx \times M) \qquad \text{Equation 2}$$

CITATION LIST

Non-Patent Literature

NPL 1
"On Limits of Wireless Communications in a Fading Environment when Using Multiple Antennas", Wireless Personal Communications 6: pp. 311-335, 1998, G. J. FOSCHINI and M. J. GANS NPL 2
F. Adachi, K. Adachi, Y. Kojima, K. Takeda, "Study on MIMO Channel Capacity in A Frequency-selective Channel", IEICE General Conference 2008, BS-1-4, March 2008

SUMMARY OF THE INVENTION

Technical Problem

As a capacity guaranteeing a transmission quality of a particular provision, an outage capacity is defined. For example, a q % outage capacity is defined as a data rate guaranteed with respect to (100-q) % of a channel. As an example, a 10% outage capacity is shown in a bold line in FIG. 1. Note that in FIG. 1, a horizontal axis indicates the data rate (transmission rate), and a vertical axis indicates a cumulative distribution function (CDF). As shown in FIG. 1, a probability that the transmission rate by which a communication can be performed without any error becomes 3.9 bps/Hz or lower becomes 10%. In other words, in a case of communicating at the transmission rate of 3.9 bps/Hz, a probability that the communication can be performed without any error becomes 10%.

Further, a relationship between a receiving SNR (Signal to Noise Ratio, or a receiving power) and a packet error rate is shown in FIG. 2. As shown in FIG. 2, they have a relationship in which the higher the receiving SNR (receiving power) is, the lower the packet error rate becomes. Further, the receiving SNR (receiving power) γ that satisfies a desired error rate (e.g. 10% shown in FIG. 2) is determined uniquely.

Here, in a conventional technique as shown in equation 2, depending on the number of multiple paths or the receiving power, there are cases in which the outage capacity cannot be increased. Hereinafter, a specific description will be made.

Firstly, a case in which the number of multiple paths is small and the receiving power per path is large will be described. Here, a case in which four transmitting antenna ports and one receiving antenna port are provided, and the desired packet error rate is 10% as shown in FIG. 2 (i.e. a case of an MISO (Multiple-Input Single-Output) channel) will be described. For example, in a case where there are a total of 2 multiple paths (M=2), namely a direct wave and a delayed wave, according to equation 2, the number of streams that can be multiplexed becomes 2 (=min(4, (2×1)). That is, despite having the number of transmitting antenna ports of 4, the radio transmission apparatus can spatially multiplex only two streams.

Further, since the total transmission power of a radio transmission apparatus is distributed to the multiple paths on the transmission path, the receiving power per path becomes larger as the number of paths is smaller. Therefore, in a case of the number of paths M=2, the receiving power per path becomes large, and a possibility of becoming larger than a receiving power γ satisfying the desired packet error rate of 10% shown in FIG. 2 is increased. In this case, a possibility that the packet error rate becoming lower than the desired packet error rate (10%) is high. However, in a calculation of the outage capacity, no matter how low the packet error rate is, such does not contribute to an increase in the outage capacity. Thus, even if the error rate becomes lower than the desired packet error rate due to the receiving power per path becoming large, since the number of streams that can be multiplexed is 2, the outage capacity does not increase. That is, in each path, power that is larger than the receiving power γ satisfying the desired error rate is wasted.

Next, a case in which the number of multiple paths is large and the receiving power per a path is small will be described. For example, a ease in which one receiving antenna port is provided, the total of the direct wave and the delayed wave is set at eight paths (M=8), and the desired packet error rate is set at 10% as shown in FIG. 2 will be described. In the total transmission power of the radio transmission apparatus, the receiving power per path becomes smaller as the number of paths is larger. Thus, in the ease of the number of paths M=8, the possibility of the receiving power per path becoming smaller than the receiving power γ satisfying the desired packet error rate of 10% shown in FIG. 2 is increased. Thus, although the number of streams that can be multiplexed becomes 8 (=8×1) according to equation 2, the receiving power γ satisfying the desired packet error rate of 10% cannot be obtained, and because of not being able to satisfy the desired error rate, the outage capacity cannot be increased.

Accordingly, depending on the number of multiple paths and the receiving power (i.e., a condition of the transmission path), a case in which the outage capacity cannot be increased may occur.

It is therefore an object of the present invention to provide a radio transmission apparatus and a precoding method that are capable of reliably increasing the outage capacity in accordance with transmission path conditions.

Solution to Problem

A radio transmission apparatus of the present invention is a radio transmission apparatus for sending a plurality of streams to a radio receiving apparatus, and employs a configuration including: a determining section that determines the number of spatial multiplexing streams based on a desired number of multiple paths, which is calculated based on a detected number of multiple paths, a number of receiving antenna ports of the radio receiving apparatus and a desired error rate of the plurality of streams, and the number of receiving antenna ports; a dividing section that divides transmission data into the plurality of streams of the number of spatial multiplexing streams; a calculating section that calculates transmission weights based on the desired number of multiple paths, the number of spatial multiplexing streams and a channel estimation value; and a precoding section that performs a precoding on the plurality of streams using the transmission weights.

A precoding method of the present invention includes: calculating a desired number of multiple paths based on a detected number of multiple paths, a number of receiving antenna ports and a desired error rate of a plurality of streams; determining the number of spatial multiplexing streams based on the desired number of multiple paths and the number of receiving antenna ports; dividing transmission data into a plurality of streams of the number of spatial multiplexing streams; calculating transmission weights based on the desired number of multiple paths, the number of spatial multiplexing streams and a channel estimation value; and performing a precoding on the plurality of streams using the transmission weights.

Advantageous Effects of Invention

According to the present invention, the outage capacity can be reliably increased according to transmission path conditions.

BRIEF DESCRIPTION OF DRAWINGS

FIG. 11 shows feedback information of Embodiment 2 of the present invention;

FIG. 13 shows other feedback information of Embodiment 2 of the present invention;

DESCRIPTION OF EMBODIMENTS

Embodiments of the present invention will be described in detail with reference to the accompanying drawings.

Embodiment 1

Figure 3:
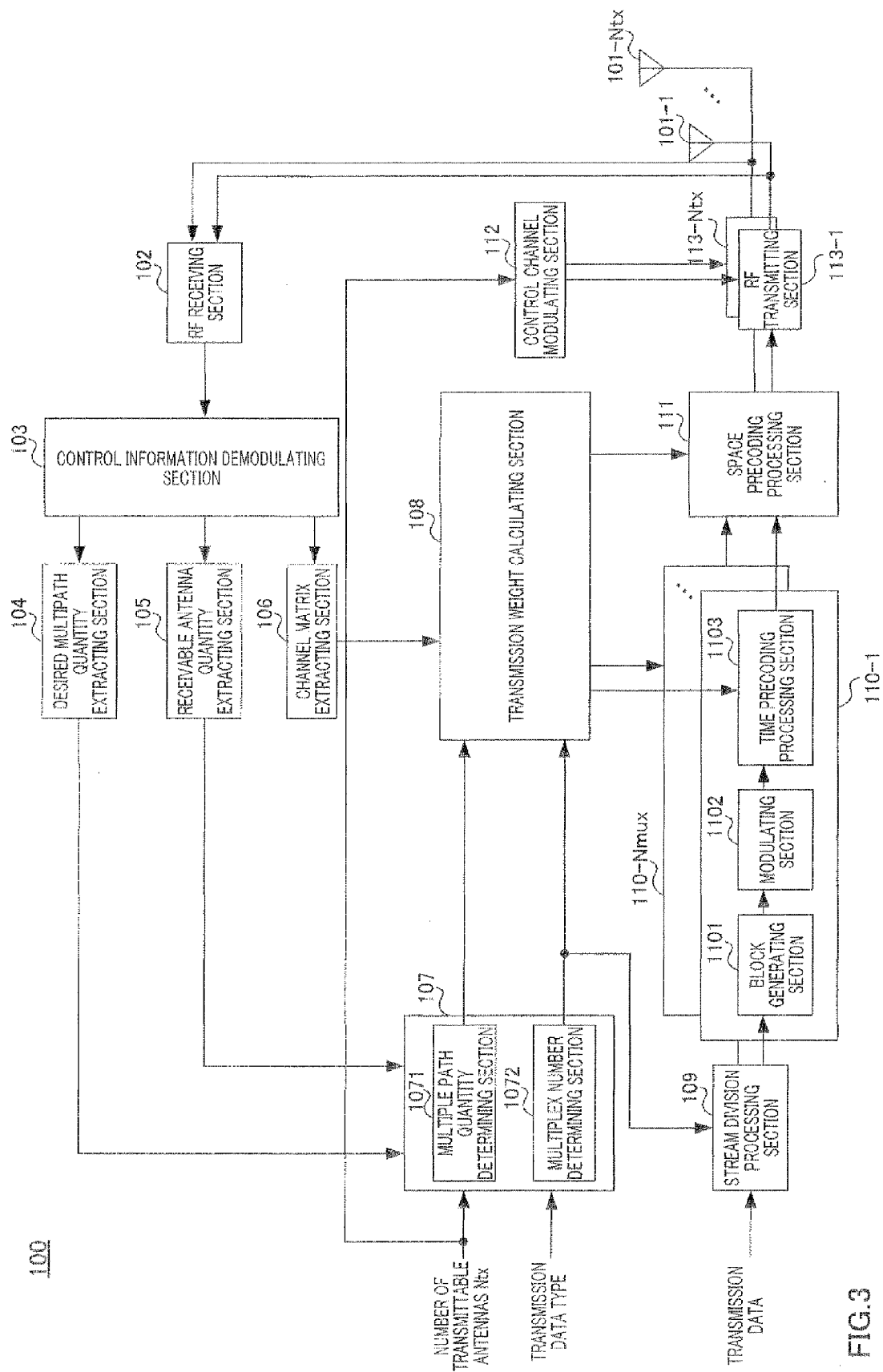
FIG. 3 is a block diagram showing a configuration of a radio transmission apparatus of Embodiment 1 of the present invention.

A configuration of radio transmission apparatus 100 of the present embodiment is shown in FIG. 3.

In radio transmission apparatus 100 shown in FIG. 3, antennas 101-1 to 101-Ntx are provided to match the number of antennas capable of multiplexing transmission (i.e. the number of transmitting antenna ports) Ntx. Further, RF transmitting sections 113-1 to 113-Ntx are provided in association with antennas 101-1 to 101-Ntx respectively. Further, stream data processing sections 110-1 to 110-Nmux are provided to match the number of multiplexing streams (i.e. the number of spatial multiplexing streams) Nmux that is determined by multiplex number determining section 1072.

In radio transmission apparatus 100 shown in FIG. 3, RF receiving section 102 receives control information respectively transmitted from radio receiving apparatus 200 to be described later via antennas 101-1 to 101-Ntx, and performs a receiving process such as down-conversion, A/D conversion, etc., on the control information. RF receiving section 102 outputs the control information that had undergone the receiving process to control information demodulating section 103. Note that, in this control information, the desired number of multiple paths (Lreq) determined by radio receiving apparatus 200, the number of antennas capable of reception (Nrx) set by radio receiving apparatus 200, and a composite channel matrix (H) including channel information (channel estimation value) of transmission antennas (antennas 101-1 to 101-Ntx) generated in radio receiving apparatus 200 are included.

Control information demodulating section 103 demodulates the control information inputted from RF receiving section 102, and outputs the control information after the demodulation to desired multiple path quantity extracting section 104, receivable antenna quantity extracting section 105, and channel matrix extracting section 106.

Desired multiple path quantity extracting section 104 extracts the desired number of multiple paths Lreq from the control information inputted from control information demodulating section 103, and outputs the extracted desired number of multiple paths Lreq to time/space assigning section 107.

Receivable antenna quantity extracting section 105 extracts the number of receivable antennas Nrx from the control information inputted from control information demodulating section 103, and outputs the extracted number of receivable antennas Nrx to time/space assigning section 107.

Channel matrix extracting section 106 extracts the composite channel matrix H from the control information inputted from control information demodulating section 103, and outputs the extracted composite channel matrix H to transmission weight calculating section 108.

In time/space assigning section 107, the number of transmittable antennas Ntx and information indicating a transmission data type (data channel, control channel, packet channel, audio channel, etc.) are inputted from an upper layer.

Time/space assigning section 107 determines the number Ntx of antennas capable of multiplexing transmission according to the inputted transmission data type. Further, multiple path quantity determining section 1071 of time/space assigning section 107 determines the desired number of multiple paths Lreq that is inputted from desired multiple path quantity extracting section 104 as the number of multiple paths to be used in a transmission weight calculation. Further, multiplex number determining section 1072 of time/space assigning section 107 determines the number of multiplexing streams Nmux based on the desired number of multiple paths Lreq inputted from desired multiple path quantity extracting section 104 and the number of receivable antennas Nrx inputted from receivable antenna quantity extracting section 105 in accordance with equation 3 below.

[3]

$$Nmux = Lreq \times Nrx \qquad \text{Equation 3}$$

Moreover, multiple path quantity determining section 1071 outputs the determined number of multiple paths Lreq to transmission weight calculating section 108, and multiplex number determining section 1072 outputs the determined number of multiplexing streams Nmux to transmission weight calculating section 108 and stream division processing section 109. Note that time/space assigning section 107 may independently determine the number of multiplexing streams Nmux and the number of multiple paths (i.e. the number of delayed transmission waves).

Transmission weight calculating section 108 calculates transmission weights in the time domain (time precoding matrix) W(t) and transmission weights in the space domain (space precoding matrix) W(s) based on the desired number of multiple paths Lreq inputted from multiple path quantity determining section 1071, the number of multiplexing streams Nmux inputted from multiplex number determining section 1072, and the composite channel matrix H inputted from channel matrix extracting section 106. Here, transmission weight calculating section 108 calculates the transmission weights W(t) by which a plurality of stream data is received by radio receiving apparatus 200 through multiple paths of the desired number of multiple paths Lreq. Then, transmission weight calculating section 108 respectively outputs the transmission weights in the time domain W(t) to each time precoding processing section 1103 of stream data processing sections 110-1 to 110-Nmux, and outputs the transmission weights in the space domain W(s) to space precoding processing section 111.

Stream division processing section 109 divides the inputted transmission data into a plurality of stream data of the number of multiplexing streams Nmux as inputted from multiplex number determining section 1072. Then, stream division processing section 109 respectively outputs the plurality (Nmux) of stream data to block generating sections 1101 of corresponding stream data processing sections 110-1 to 110-Nmux.

Stream data processing sections 110-1 to 110-Nmux each comprise block generating section 1101, modulating section 1102, and time precoding processing section 1103. Hereinafter, internal configurations of stream data processing sections 110-1 to 110-Nmux will be described in detail.

Block generating section 1101 blocks the stream data inputted from stream division processing section 109, for instance, into a block comprised of N samples (symbols). Further, block generating section 1101 appends a cyclic prefix (CP) to each of the generated blocks. Then, block generating section 1101 outputs the blocked stream data to modulating section 1102.

Modulating section 1102 modulates the stream data inputted from block generating section 1101, and outputs the stream data after the modulation to time precoding processing section 1103.

Time precoding processing section 1103 performs precoding on the stream data inputted from modulating section 1102 using the transmission weights in the time domain W(t) inputted from transmission weight calculating section 108. Specifically, time precoding processing section 1103 multiplies the transmission weights in the time domain W(t) to the stream data. Then, time precoding processing section 1103 outputs the stream data multiplied by transmission weights W(t) to space precoding processing section 111.

Space precoding processing section 111 performs precoding on the plurality of stream data inputted respectively from time precoding processing sections 1103 of stream data processing sections 110-1 to 110-Nmux using the transmission weights in the space domain W(s) inputted from transmission weight calculating section 108. Specifically, space precoding processing section 111 multiplies the plurality of stream data by the transmission weights in the space domain W(s). Then, space precoding processing section 111 outputs the stream data (Ntx pieces of data) multiplied by the transmission weights W(s) respectively, to corresponding RF transmitting sections 113-1 to 113-Ntx.

Control channel modulating section 112 modulates the control channel including the number of transmittable antennas Ntx, and outputs the control channel after the modulation respectively to RF transmitting sections 113-1 to 113-Ntx.

RF transmitting sections 113-1 to 113-Ntx perform a transmission process such as D/A conversion, amplification and up-conversion, etc., on pilots respectively inputted from antennas 101-1 to 101-Ntx (not shown), the stream data inputted from space precoding processing section 111, and the control channel inputted from control channel modulating section 112. Then, RF transmitting sections 113-1 to 113-Ntx transmit signals that have undergone the transmission process to radio receiving apparatus 200 from antennas 101-1 to 101-Ntx. By this, the plurality of stream data is transmitted to radio receiving apparatus 200.

Next, a radio receiving apparatus of the present embodiment will be described. A configuration of radio transmission apparatus 200 of the present embodiment is shown in FIG. 4.

Figure 4:
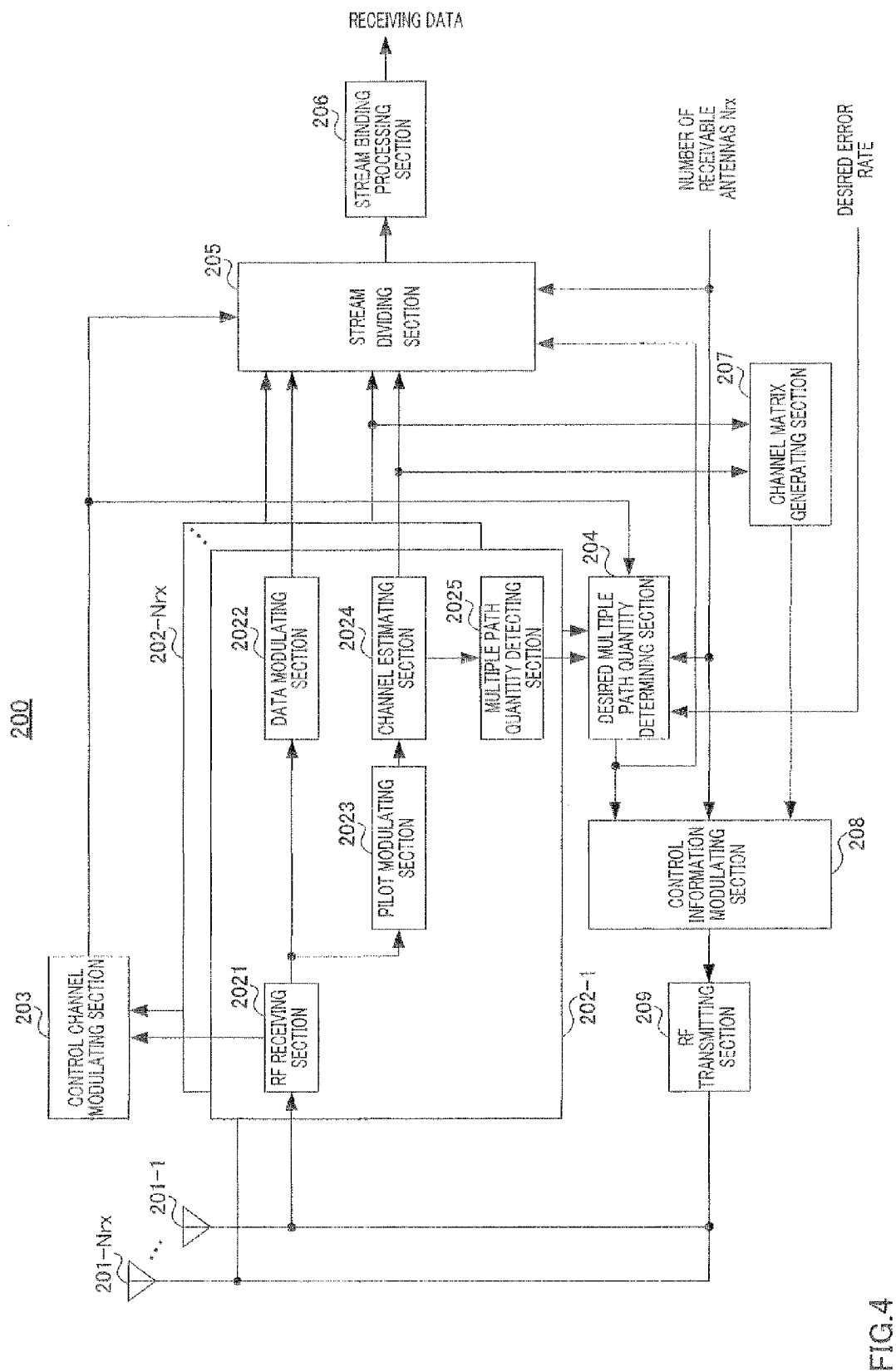
FIG. 4 is a block diagram showing a configuration of a radio receiving apparatus of Embodiment 1 of the present invention.

In radio receiving apparatus 200 shown in FIG. 4, antennas 201-1 to 201-Nrx are provided corresponding to the number of receivable antennas Nrx. Further, receiving signal processing sections 202-1 to 202-Nrx are respectively provided in association with antennas 201-1 to 201-Nrx.

Receiving signal processing sections 202-1 to 202-Nrx each comprises RF receiving section 2021, data demodulating section 2022, pilot demodulating section 2023, channel estimating section 2024 and multiple path quantity detecting section 2025. Internal configurations of receiving signal processing sections 202-1 to 202-Nrx will be explained below, in detail.

Each of RE receiving sections 2021 of receiving signal processing sections 202-1 to 202-Nrx performs a receiving process such as down-conversion, A/D conversion, etc., on the receiving signals respectively inputted via antennas 201-1 to 201-Nrx. Then, RF receiving section 2021 outputs data signals included in the received signal to data demodulating section 2022, outputs pilots to pilot demodulating section 2023, and outputs the control channel to control channel demodulating section 203.

Data modulating section 2022 demodulates the data signals inputted from RE receiving section 2021, and outputs the data signals after the demodulation to stream demultiplexing section 205.

Pilot demodulating section 2023 demodulates the pilots for each of transmission antenna ports (antennas 101-1 to 101-Ntx) of radio transmission apparatus 100 inputted from RF receiving section 2021, and outputs the pilots after the demodulation to channel estimating section 2024.

Channel estimating section 2024 performs channel estimation for each multipath using the pilots inputted from pilot demodulating section 2023. Then, channel estimating section 2024 outputs the channel estimation value as estimated to multiple path quantity detecting section 2025, stream demultiplexing section 205 and channel matrix generating section 207.

Multiple path quantity detecting section 2025 detects a number of multiple paths M by using the channel estimation value inputted from channel estimating section 2024. Here, the number of multiple paths (detected number of multiple paths) M detected in multiple path quantity detecting section 2025 is the number of multiple paths in a case in which the precoding process had not been performed in radio transmission apparatus 100. Then, multiple path quantity detecting section 2025 outputs the detected number of multiple paths M to desired multiple path quantity determining section 204.

Control channel demodulating section 203 demodulates the control channels inputted from each RF receiving section 2021 of receiving signal processing sections 202-1 to 202-Nrx, and extracts the number of antennas capable of multiplexing transmission, Ntx, included in the demodulated control channels. Then, control channel demodulating section 203 outputs the extracted number Ntx of antennas capable of multiplexing transmission to desired multiple path quantity determining section 204 and stream demultiplexing section 205.

In desired multiple path quantity determining section 204, stream demultiplexing section 205 and control information modulating section 208, the number of receivable antennas Nrx is inputted from an upper layer.

Desired multiple path quantity determining section 204 determines the desired number of multiple paths Lreq based on the number of multiple paths M inputted from each multiple path quantity detecting section 2025 of receiving signal processing sections 202-1 to 202-Nrx, the inputted receivable antenna number Nrx, the desired error rate of the plurality of stream data, and the number of antennas capable of multiplexing transmission, Ntx, inputted from control channel demodulating section 203. For example, desired multiple path quantity determining section 204 calculates the number of multiple paths by which receiving power per stream becomes the receiving power (receiving SNR) $\gamma$ that is necessary to satisfy the desired error rate shown in FIG. 2, and determines that number of multiple paths as the desired number of multiple paths Lreq. Then, desired multiple path quantity determining section 204 outputs the determined desired number of multiple paths Lreq to stream demultiplexing section 205 and control information modulating section 208. Here, radio receiving apparatus 200 separates streams of Nrx×Lreq in a two-dimension of the space domain and the time domain. Thus, in a case of Lreq=1, all of the streams are multiplexed in the space domain, and in a case of Lreq=Ntx, all of the streams are multiplexed in the time domain.

Stream demultiplexing section 205 separates (Nmux× Lreq) streams in the space domain and the time domain from data signals that are respectively inputted from each data demodulating section 2022 of receiving signal processing sections 202-1 to 202-Nrx by using the channel estimation values inputted from each channel estimating section 2024 of receiving signal processing sections 202-1 to 202-Nrx, the number of antennas capable of multiplexing transmission, Ntx, inputted from control channel demodulating section 203 and the desired number of multiple paths Lreq inputted from desired multiple path quantity determining section 204. Then, stream demultiplexing section 205 outputs the separated streams to stream binding processing section 206.

Stream binding processing section 206 binds the streams inputted from stream demultiplexing section 205, and outputs data after the binding as the receiving data.

Channel matrix generating section 207 generates the composite channel matrix H including channel information corresponding to the transmission antenna ports (antennas 101-1 to 101-Ntx) of radio transmission apparatus 100 by using the channel estimation values inputted from each channel estimating section 2024 of receiving signal processing sections 202-1 to 202-Nrx. Then, channel matrix generating section 207 outputs the generated composite channel matrix H to control information modulating section 208.

Control information modulating section 208 modulates the desired number of multiple paths Lreq inputted from desired multiple path quantity determining section 204, the composite channel matrix H inputted from channel matrix generating section 207 and the control information including the number of receivable antennas Nrx, and outputs the control information after the modulation to RF transmitting section 209.

RF transmitting section 209 performs a transmission process such as D/A conversion, amplification and up-conversion, etc., on the control information inputted from control information modulating section 208, and sends the control information after the transmission process to radio transmission apparatus 100 through antennas 201-1 to 201-Nrx.

Next, the precoding process of the present embodiment will be described in detail.

Figure 1:
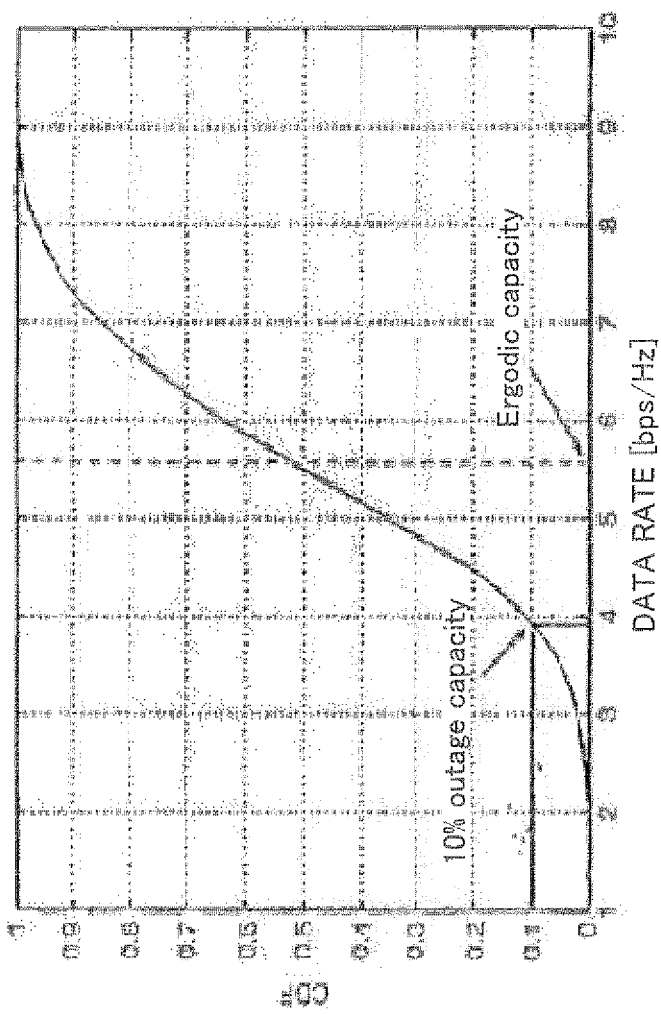
FIG. 1 shows a relationship of an outage capacity and a CDF.
Figure 2:
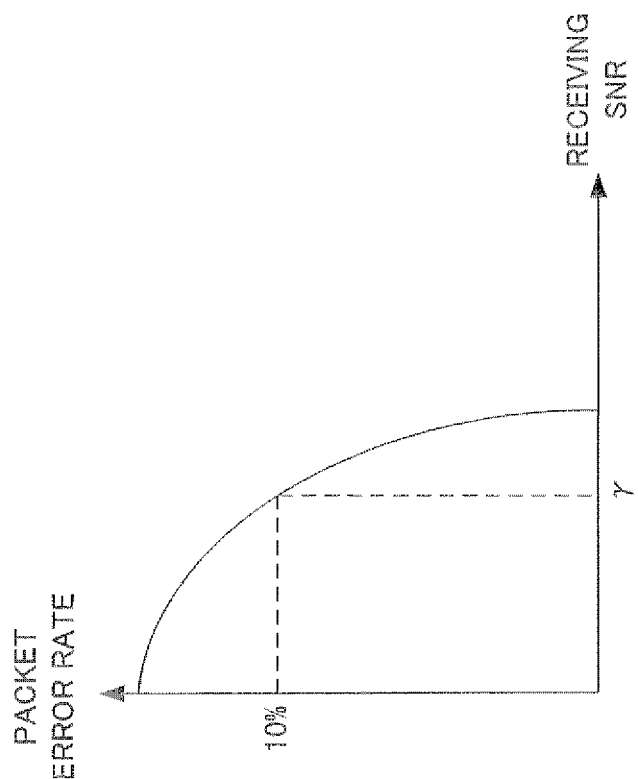
FIG. 2 shows a relationship of a receiving SNR and a packet error rate.

First, a method of setting the receiving SNR (receiving power) $\gamma$ that satisfies the desired error rate shown in FIG. 2 will be described.

Figure 5:
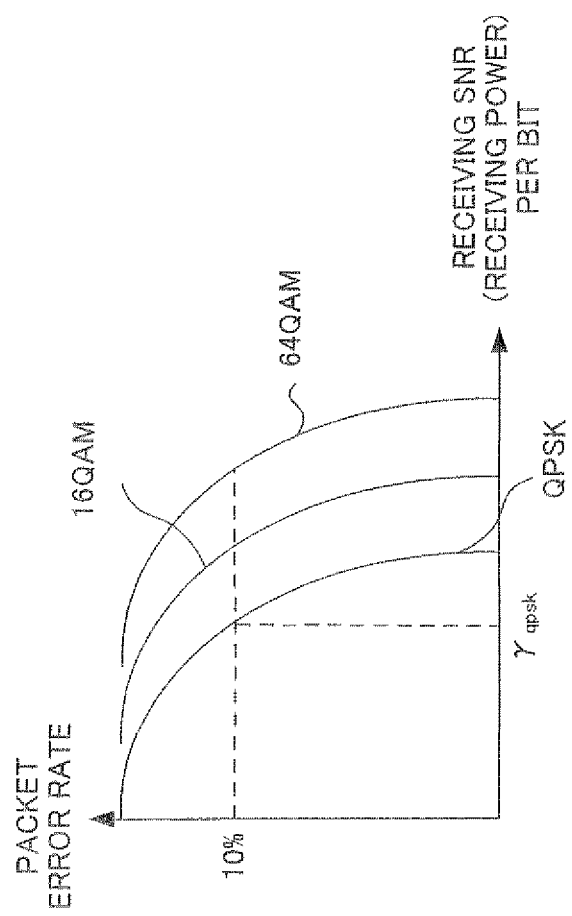
FIG. 5 shows a relationship of the receiving SNR per bit and the packet error rate in respective modulation schemes of Embodiment 1 of the present invention.

The packet error rate with respect to the receiving power (receiving SNR) per bit in cases of the modulation scheme being QPSK, 16QAM and 64QAM is shown in FIG. 5. Here, as the M-ary modulation value becomes larger, although the number of bits that can be transmitted per symbol is increased, a variation occurs in the error rate between bits transmitted in one symbol. Specifically, of the bits transmitted in one symbol, lower bits are more likely to cause error than upper bits. Thus, as shown in FIG. 5, the packet error rate with respect to the receiving power per bit is the lowest with QPSK, and as the M-ary modulation value becomes larger, the packet error rate is increased. Further, as the M-ary modulation value becomes larger, the receiving power having no lower bits causing error is further increased. Specifically, as shown in FIG. 5, as the M-ary modulation value is increased, in order to achieve the same packet error rate (e.g. the packet error rate of 10% shown in FIG. 5), the receiving power necessary per bit becomes higher. Note that, although the QAM scheme has been described herein as the modulation scheme, the above characteristic (FIG. 5) can similarly be observed with other modulation scheme such as PSK scheme, etc. That is, even with the other modulation scheme such as the PSK scheme, there is a characteristic that the packet error rate with respect to the receiving SNR (receiving power) per bit increases as the number of bits transmitted in one symbol is increased.

Figure 6:
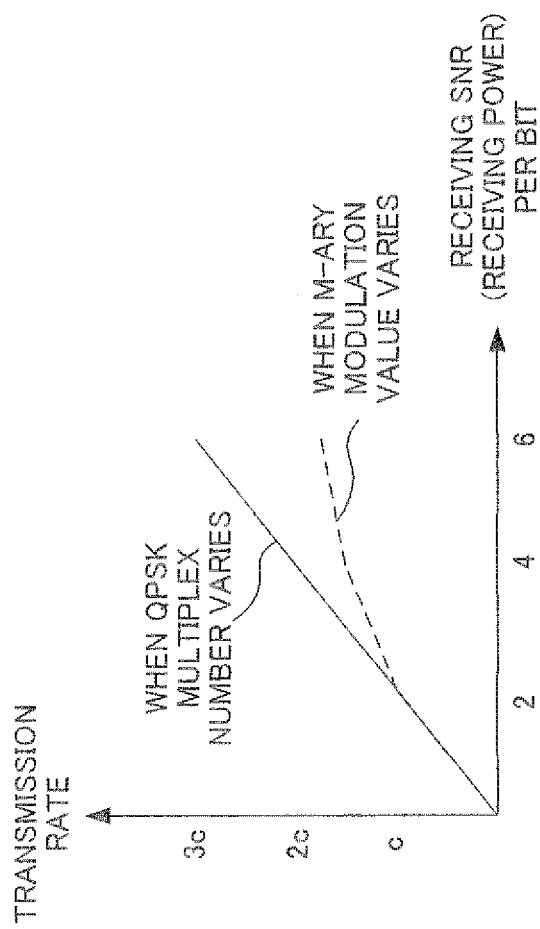
FIG. 6 shows a relationship of the receiving SNR per bit and a transmission rate in Embodiment 1 of the present invention.

Next, a transmission rate with respect to the receiving SNR (receiving power) per bit is shown in FIG. 6. As shown in FIG. 6, in a case of varying a multiplex number of QPSK, the transmission rate proportionate to the receiving power per bit can be obtained. With respect to this, as shown in FIG. 6, in a case of varying the M-ary modulation value such as in an adaptive modulation (AMC: Adaptive Modulating and Coding), etc., as the receiving power per bit becomes higher (i.e. as the M-ary modulation value is increased by the adaptive modulation), the transmission rate proportionate to the receiving power becomes difficult to achieve. This is due to the packet error rate becoming higher as the M-ary modulation value is larger, as shown in FIG. 5. That is, in order to obtain the transmission rate (capacity) proportionate to the receiving SNR (receiving power) per bit, the transmission rate (capacity) can be made higher by transmitting signals in parallel by a modulation scheme such as QPSK, etc. that has a superior receiving SNR characteristic per bit and varying the number of parallel signals, rather than varying the M-ary modulation value (i.e. varying the number of bits to be transmitted in one symbol) such as in adaptive modulation. That is, radio receiving apparatus 200 can expect an increase in the transmission rate (capacity) by performing communication while varying a transmission multiplex number of transmitting the QPSK in parallel (i.e., varying the number of multiplexing streams Nmux to be multiplexed in the two dimensions of space and time) rather than varying the modulation scheme depending on transmission path conditions, for example, the receiving SNR (receiving power).

By focusing on the above characteristic, desired multiple path quantity determining section 204 of radio receiving apparatus 200 determines the desired number of multiple paths Lreq such that it will be a value by which the receiving power (receiving SNR) of each stream data of the received signals (plurality of stream data) satisfies the desired error rate in QPSK communication. Further, time/space assigning section 107 of radio transmission apparatus 100 determines the number of multiplexing streams Nmux based on the desired number of multiple paths Lreq calculated based on a specific error rate in QPSK communication. Further, transmission weight calculating section 108 of radio transmission apparatus 100 controls the transmission weights such that they will be values by which the receiving power (receiving SNR) of each stream data of the signals (plurality of stream data) received by radio receiving apparatus 200 satisfies the desired error rate in QPSK communication.

Figure 7:
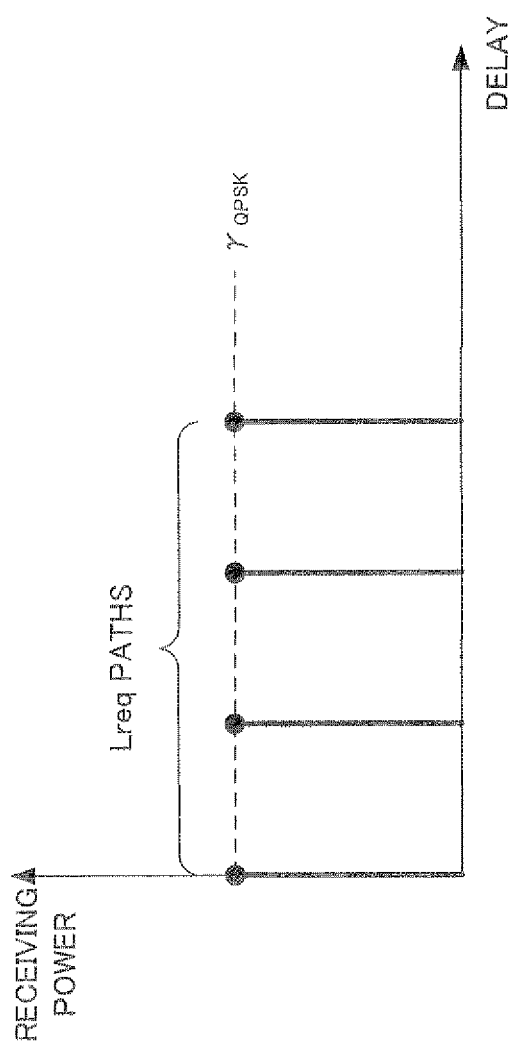
FIG. 7 shows multiple paths detected by the radio receiving apparatus of Embodiment 1 of the present invention.

For example, as shown in FIG. 7, in the case of Nrx=1 (a case in which the number of multiple paths and the number of multiplexing streams are the same), radio receiving apparatus 200 determines the desired number of multiple paths Lreq that becomes a value by which the receiving power of each path satisfies the desired error rate ($\gamma=\gamma_{qpsk}$). Here, $\gamma_{qpsk}$ is the receiving power (receiving SNR) satisfying the desired error rate upon performing the QPSK communication. Then, radio transmission apparatus 100 calculates the transmission weights such that a plurality of stream data is received by radio receiving apparatus 200 using the multiple paths of the desired number of multiple paths Lreq that are fed back from radio receiving apparatus 200.

That is, in FIG. 7, even in the case where the receiving power (receiving SNR) becomes large, radio transmission apparatus 100 increases the number of multiplexing streams not by increasing the M-ary modulation value, but by increasing the number of multiple paths such that the receiving power of each path becomes $\gamma_{qpsk}$. In other words, radio transmission apparatus 100 increases the number of multiplexing streams in the time domain. Accordingly, by constantly using the QPSK as the modulation scheme and varying the multiplexing number of streams performing the QPSK communication, as shown in FIG. 6, the transmission rate proportionate to the receiving power can be obtained, and the outage capacity can be increased.

Next, a method of calculating the transmission weights W(t) and W(s) in transmission weight calculating section 108 of radio transmission apparatus 100 will be described. In the description below, the number of the antennas capable of multiplexing transmission is Ntx, and the number of multiplexing streams is Nmux. Further, one stream is formed of one block (the unit of adding CPs) consisting of N samples (symbols). Further, the number of receivable antennas Nrx is 1 (i.e. the MISO system).

In this case, the receiving block signal after the removal of CP in radio receiving apparatus 200 is expressed in following equation 4.

Equation 4

$$Y = HW^{(s)}W^{(t)}S \quad [4]$$
$$= [H_0, H_1, \ldots, H_{N_{tx}-1}]$$

$$\begin{bmatrix} w_{0,0}^{(s)}I & w_{0,1}^{(s)}I & \cdots & w_{0,\frac{N_{mux}}{L_{req}}-1}^{(s)}I \\ w_{1,0}^{(s)}I & w_{1,1}^{(s)}I & \ddots & \vdots \\ \vdots & \ddots & \ddots & \vdots \\ w_{N_{tx}-1,0}^{(s)}I & \cdots & \cdots & w_{N_{tx}-1,\frac{N_{mux}}{L_{req}}-1}^{(s)}I \end{bmatrix}$$

$$\begin{bmatrix} W_0^{(t)} & 0 & \cdots & 0 \\ 0 & W_1^{(t)} & \ddots & \vdots \\ \vdots & \ddots & \ddots & 0 \\ 0 & \cdots & 0 & W_{\frac{N_{mux}}{L_{req}}-1}^{(t)} \end{bmatrix} \begin{bmatrix} S_0 \\ S_1 \\ \vdots \\ S_{N_{mux}-1} \end{bmatrix}$$

In equation 4, Y is a receiving block signal vector of (N×1), H is a composite channel matrix of (N×(N·Ntx)), $W^{(s)}$ is a space precoding matrix of ((N·Ntx)×(N·Nmux/Lreq)), $W^{(t)}$ is a time precoding matrix of ((N·Nmux/Lreq)×(N·Nmux)), and S is a transmission symbol vector of $((N \cdot Nmux) \times 1)$. Further, I is a unit matrix of $(N \times N)$, and 0 is a zero vector of $(N \times N)$. Further, a composite channel matrix $H_{ntx}$, (provided $n_{tx}=0, 1, \ldots, Ntx-1$) can be expressed by following equation 5.

Equation 5

$$H_{n_{tx}} = \begin{bmatrix} h_0 & 0 & \cdots & 0 & h_{M-1} & \cdots & h_1 \\ h_1 & h_0 & 0 & & \ddots & \ddots & \vdots \\ \vdots & h_1 & \ddots & \ddots & & \ddots & h_{M-1} \\ h_{M-1} & & \ddots & & & & 0 \\ 0 & & & \ddots & & \ddots & \vdots \\ \vdots & \ddots & & & \ddots & \ddots & 0 \\ 0 & \cdots & 0 & h_{M-1} & \cdots & h_1 & h_0 \end{bmatrix} \quad [5]$$

Figure 8:
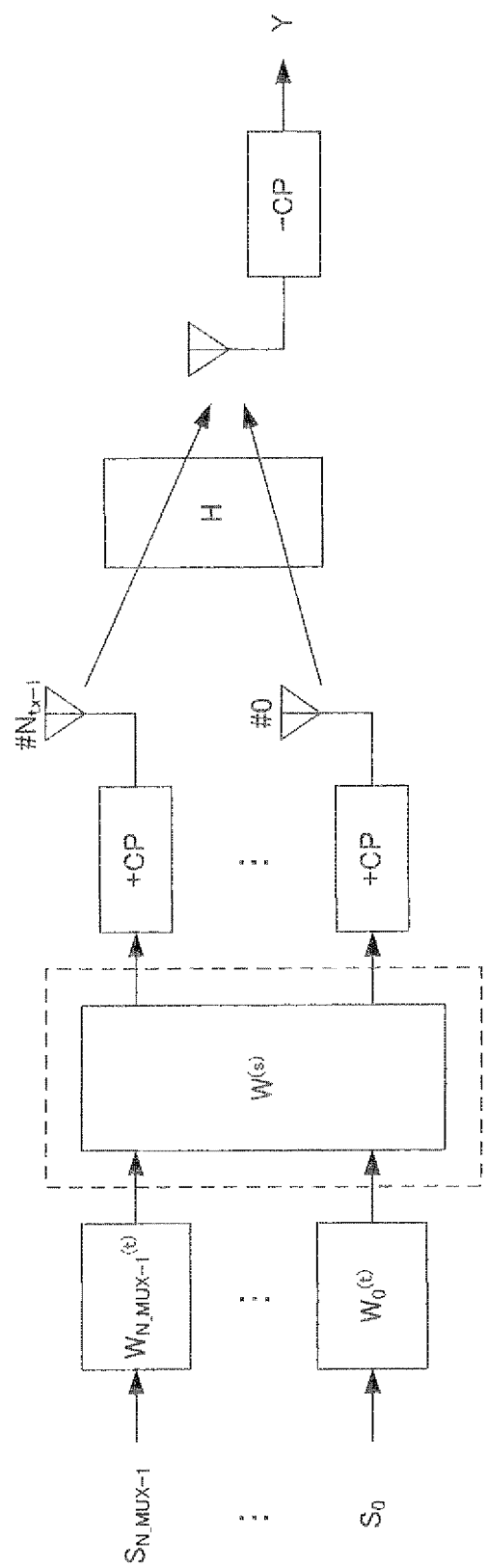
FIG. 8 is a block diagram presenting a system of Embodiment 1 of the present invention in equations.

A block diagram of a system expressed by the above equation 4 is shown in FIG. 8. As shown in FIG. 8, the transmission weights multiplied to the transmission symbol vectors S are set separately as the time precoding matrix $W^{(t)}$ and the space precoding matrix $W^{(s)}$. Note that, '+CP' shown in FIG. 8 indicates a CP addition, and '−CP' indicates a CP removal.

Here, the time precoding matrix $W^{(t)}$ is weights for setting the number of multiple paths as Lreq. Further, the time precoding matrix $W^{(t)}$ is weights for performing adjustment of a sampling timing in the D/A conversion for each antenna by a sampling rate that is faster than a D/A sampling rate in the D/A conversion (i.e. by oversampling). Specifically, the time precoding matrix $W^{(t)}$ retains a function to surely divide the streams without any multipath interference in radio receiving apparatus 200 by coinciding a timing of receiving the multipath in radio receiving apparatus 200 to a Nyquist timing.

Further, the space precoding matrix $W^{(t)}$ is weights that assign streams to the Ntx antenna ports (antennas 101-1 to 101-Ntx shown in FIG. 3) of radio transmission apparatus 100, respectively.

Here, a channel matrix of the transmission path by which radio receiving apparatus 200 can receive a plurality of stream data using multiple paths of the number of multiple paths Lreq determined in multiple path quantity determining section 1071 is assumed as a desired channel matrix $\tilde{H}$ ($N \times a$ matrix of ($N \cdot Ntx$)), and the desired channel matrix $\tilde{H}$ is expressed by following equation 6. Further, the desired channel matrix $\tilde{H}_{ntx}$ (provided $ntx=0, 1, \ldots, Ntx-1$) in equation 6 can be expressed by following equation 7.

[6]

$$\tilde{H} = [\tilde{H}_0, \tilde{H}_1, \ldots, \tilde{H}_{N_{tx}-1}] \qquad \text{Equation 6}$$

Equation 7

$$\tilde{H}_{n_{tx}} = \begin{bmatrix} h_0 & 0 & \cdots & 0 & h_{Lreq-1} & \cdots & h_1 \\ h_1 & h_0 & 0 & & \ddots & \ddots & \vdots \\ \vdots & h_1 & \ddots & \ddots & & \ddots & h_{Lreq-1} \\ h_{Lreq-1} & & \ddots & & & & 0 \\ 0 & & & \ddots & & \ddots & \vdots \\ \vdots & \ddots & & & \ddots & \ddots & 0 \\ 0 & \cdots & 0 & h_{Lreq-1} & \cdots & h_1 & h_0 \end{bmatrix} \quad [7]$$

In equation 7, in order for the receiving power for each path of the number of multiple paths Lreq to be the receiving power $\gamma_{qpsk}$ necessary for satisfying the desired error rate (desired quality) as shown in FIG. 7, simply, following equation 8 needs to be satisfied.

[8]

$$|h_0|^2 = |h_1|^2 = |h_1|^2 = \ldots = |h_{Lreq-1}|^2 \gamma_{qpsk} \qquad \text{Equation 8}$$

At this occasion, the receiving block signal vector Y shown in equation 4 is expressed in following equation 9.

[9]

$$Y = HW^{(s)}W^{(t)}S = \tilde{H}S \qquad \text{Equation 9}$$

That is, a product of the space precoding matrix $W^{(s)}$ and the time precoding matrix $W^{(t)}$ (time-space precoding matrix) $W^{(s)}W^{(t)}$ is expressed by following equation 10.

[10]

$$W^{(s)}W^{(t)} = H^H(HH^H)^{-1}\tilde{H} \qquad \text{Equation 10}$$

That is, the time-space precoding matrix shown in equation 10 is transmission weights in which the number of multiple paths of receiving signals received by radio receiving apparatus 200 is Lreq, the receiving sampling timing in radio receiving apparatus 200 is the Nyquist timing (i.e. a timing that does not interfere in the time domain), and the receiving power (receiving SNR) for each stream after the time/space division is $\gamma_{qpsk}$.

Note that, here, although the case with the number of receivable antennas Nrx being 1 (i.e. the case of the MISO system) has been described, the present invention is equally applicable to cases with the number of receivable antennas Nrx being 2 or more (i.e. cases of the MIMO system). In this case, radio transmission apparatus 100 calculates the transmission weights corresponding to respective receiving antennas of the number of receivable antennas Nrx (e.g. the transmission weights shown in equation 10). That is, the number of transmission weights calculated in radio transmission apparatus 100 is increased by the number of receivable antennas Nrx.

Figure 9:
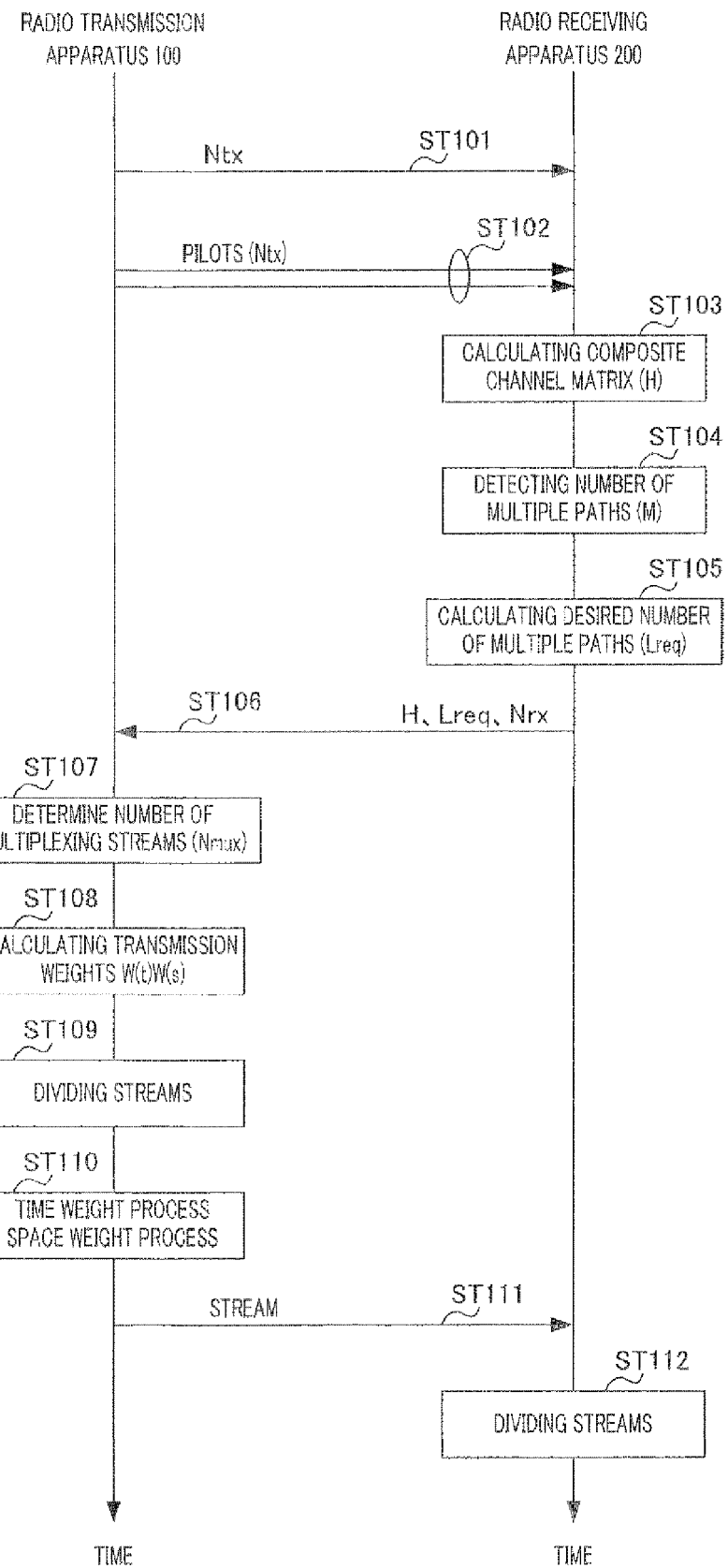
FIG. 9 is a sequence diagram showing procedures of a precoding process of Embodiment 1 of the present invention.

Next, procedures in the precoding process of the present embodiment will be described. FIG. 9 is a sequence diagram showing the procedures of the precoding process of the present embodiment.

In step (hereinafter referred to as ST) 101, radio transmission apparatus 100 transmits the number of antennas capable of multiplexing transmission, Ntx, to radio receiving apparatus 200.

In ST102, radio transmission apparatus 100 transmits the pilots for each of antennas 101-1 to 101-Ntx (i.e. Ntx pilots) to radio receiving apparatus 200.

In ST103, radio receiving apparatus 200 performs channel estimation using the pilots received in ST102, and calculates a composite channel matrix H, for example, as shown in equation 5. In ST104, radio receiving apparatus 200 detects a number of multiple paths M (i.e. the number of multiple paths M that is detected in radio receiving apparatus 200 in the case where the weight process is not performed in radio transmission apparatus 100) based on the channel estimation value estimated in ST103.

In ST105, radio receiving apparatus 200 calculates a desired number of multiple paths Lreq based on the number of receivable antennas Nrx, the number of multiple paths M detected in ST104 and the desired error rate. That is, radio receiving apparatus 200 determines the number of multiple paths that becomes the receiving SNR ($\gamma_{qpsk}$) that is necessary for the receiving SNR (receiving power) per stream to satisfy the desired error rate as the desired number of multiple paths Lreq.

In ST106, radio receiving apparatus 200 transmits the composite channel matrix H, the desired number of multiple paths Lreq and the number of receivable antennas Nrx to radio transmission apparatus 100.

In ST107, radio transmission apparatus 100 determines a number of multiplexing streams Nmux based on the desired number of multiple paths Lreq and the number of receivable antennas Nrx obtained in ST106.

In ST108, radio transmission apparatus 100 determines transmission weights (W(t) and W(s)) based on the composite channel matrix H and the desired number of multiple paths Lreq obtained in ST106 and the number of multiplexing streams Nmux determined in ST107.

In ST109, radio transmission apparatus 100 divides the transmission data into a plurality of streams of the number of multiplexing streams determined in ST107. In ST110, radio transmission apparatus 100 performs precoding (the time weight process and the space weight process) on the plurality of streams generated in ST109 using the transmission weights (W(t) and W(s)) determined in ST108.

In ST111, radio transmission apparatus 100 transmits the plurality of streams that are multiplexed in the space domain and the time domain by the process of ST110 to radio receiving apparatus 200. That is, in ST111, radio receiving apparatus 200 receives, for example, as shown in FIG. 7, the plurality of streams through Lreq multiple paths in the time domain. In ST112, radio receiving apparatus 200 separates the receiving signal received in ST111 into a plurality of streams in the space domain and the time domain.

Consequently, according to the present embodiment, the radio receiving apparatus calculates the desired number of multiple paths Lreq that is to be the value $\gamma$ (or $\gamma_{qpsk}$) by which the receiving power of each path satisfies the desired error rate based on the number of multiple paths M detected from the actual transmission path, the number of receivable antenna ports Nrx and the desired error rate of the plurality of streams. Then, the radio transmission apparatus calculates the transmission weights based on the calculated desired number of multiple paths Lreq and the number of multiplexing streams, and performs precoding on the streams.

By this in the radio receiving apparatus, Lreq paths having the receiving power satisfying the desired error rate (e.g. 10% in FIG. 2) are detected. That is, in the radio receiving apparatus, paths having the minimum necessary receiving power to satisfy the desired error rate are detected. In other words, paths having the receiving power satisfying the desired error rate are secured at a maximum in the time domain. Consequently, according to the present embodiment, since the radio transmission apparatus can control such that the receiving power of each stream becomes the receiving power satisfies the desired error rate and can multiplex the maximum number of streams in the time domain, the outage capacity can be reliably increased according to transmission path conditions.

Further, according to the present embodiment, the radio receiving apparatus determines the desired number of multiple paths Lreq such that the receiving power (receiving SNR) of each stream becomes the receiving power $\gamma_{qpsk}$ that satisfies the desired error rate in QPSK communication. From this, since the streams having the receiving power that satisfies the desired error rate in QPSK communication are multiplexed for the desired number of multiple paths Lreq, thus, as shown in FIG. 6 (bold line), the transmission rate proportionate to the receiving power can be obtained.

Further, according to the present embodiment, the radio transmission apparatus calculates the transmission weights (time precoding matrix) in the time domain such that the receiving timing of the multiple paths becomes the Nyquist timing. From this, the radio receiving apparatus can surely separate the multiple paths since the timing of receiving the multiple paths can be synchronized to the Nyquist timing.

In the above, the case with the number of receivable antennas Nrx being 1 (i.e. the case with the MISO system) has been described by way of example. That is, for instance, since the receiving power per path as shown in FIG. 7 becomes the receiving power per stream, radio transmission apparatus 100 calculated the transmission weights by which the receiving power per path becomes $\gamma_{qpsk}$. However, the present invention is not limited to the MISO system, but may be adapted to the MIMO systems (having Nrx of 2 or more). In this case, radio transmission apparatus 100 simply needs to calculate the transmission weights by which the receiving power per stream in the case of having divided the streams multiplexed in the time domain and the space domain becomes $\gamma_{qpsk}$. That is, in a case of Ntx (the number of antennas capable of multiplexing transmission)>Nrx (the number of receivable antennas)×L (the number of multiple paths), radio transmission apparatus 100 simply needs to calculate the transmission weights by which the receiving power of (Nrx×L) streams respectively becomes $\gamma_{qpsk}$.

Note that, in the MIMO system, the number of streams to be multiplexed ins the space domain may differ depending on the timing of each path. This is because a channel correlation in the space domain becomes high at a timing of a particular path, and there are cases in which streams to match the number of antenna ports cannot be multiplexed in the space domain at the timing of that particular path. In this case, the number of streams that can be multiplexed is not Nrx×L.

Embodiment 2

In the present embodiment, the radio receiving apparatus calculates the transmission weights, and feeds back the calculated transmission weights to the radio transmission apparatus.

Figure 10:
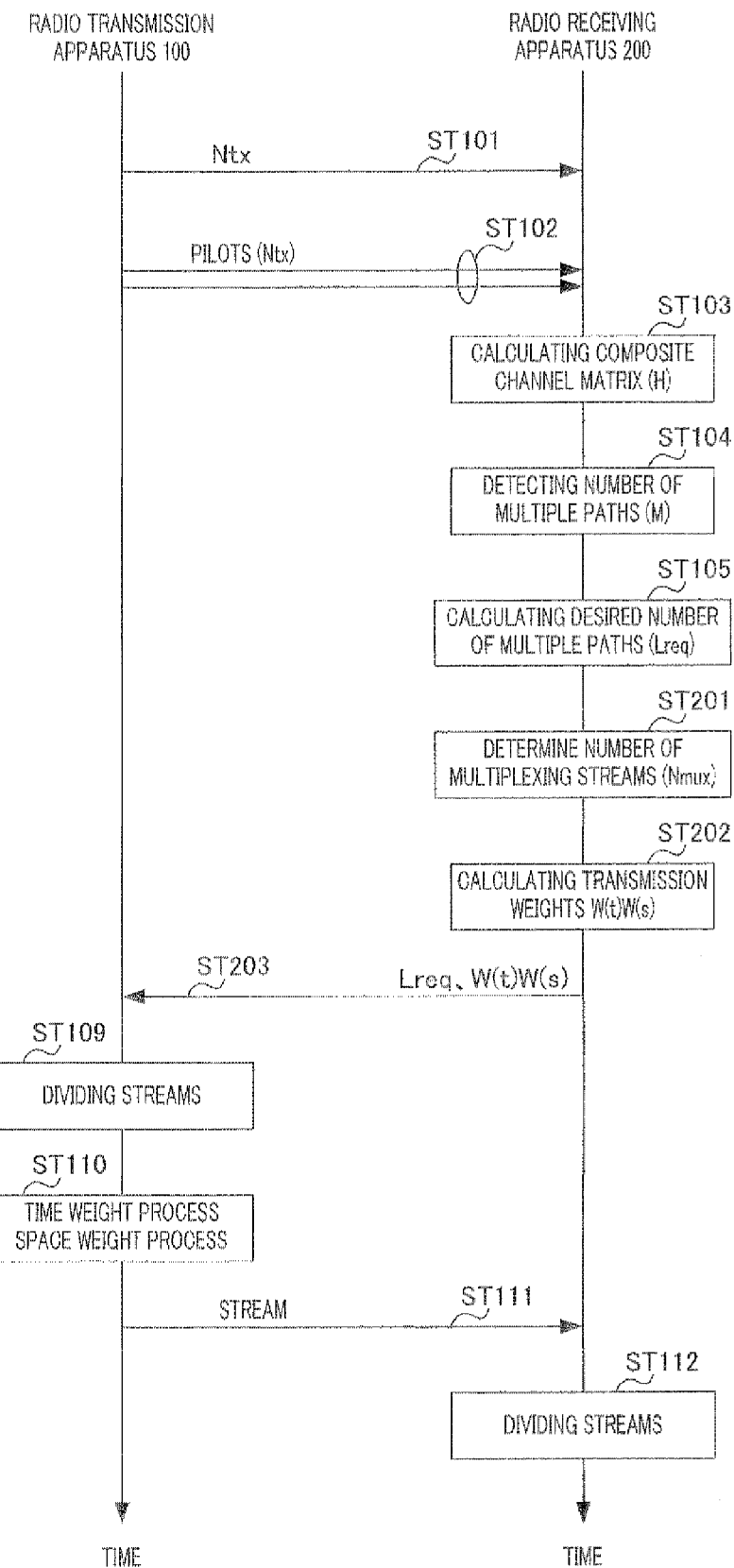
FIG. 10 is a sequence diagram showing procedures of a precoding process of Embodiment 2 of the present invention.

Hereinafter, a specific description will be made. FIG. 10 is a sequence diagram showing the procedures of the precoding process of the present embodiment. Note that, in FIG. 10, parts in common with FIG. 9 are given the same reference signs as in FIG. 9, and the detailed description thereof will not be repeated here.

As shown in FIG. 10, in ST201, radio receiving apparatus 200 of the present embodiment determines the number of multiplexing streams Nmux based on the number of receivable antennas Nrx and the desired number of multiple paths Lreq calculated in ST104, similar to multiplex number determining section 1072 of time/space assigning section 107 of radio transmission apparatus 100 of Embodiment 1.

In ST202, radio receiving apparatus 200 calculates the transmission weights (W(t) and W(s)) based on the desired number of multiple paths Lreq calculated in ST105, the number of multiplexing streams Nmux determined in ST201 and the composite channel matrix H calculated in ST103, similar to transmission weight calculating section 108 of radio transmission apparatus 100 of Embodiment 1.

In ST203, radio receiving apparatus 200 feeds back the desired number of multiple paths Lreq and the transmission weights (W(t) and W(s)) to radio transmission apparatus 100 of the present embodiment. Here, radio receiving apparatus 200 feeds back the desired number of multiple paths Lreq and the transmission weights (the space precoding matrix W(s) and the time precoding matrix W(t)) using a precoding matrix indicator (PMI: Precoding Matrix Indicator) as shown in FIG. 11. That is, radio receiving apparatus 200 feeds back, from among PMI #0 to #14, a PMI corresponding to the calculated Lreq, W(s) and W(t) to radio transmission apparatus 100.

Thus, radio transmission apparatus 100 of the present embodiment does not perform ST107 and ST108 of Embodiment 1 (FIG. 9), and in ST110, performs the precoding (the time weight process and the space weight process) on the streams using the transmission weights (W(t) and W(s)) fed back in ST203.

Consequently, according to the present embodiment, even in the case where the radio receiving apparatus calculates the transmission weights and feeds back the calculated transmission weights to the radio transmission apparatus, a similar effect to that of Embodiment 1 can be obtained.

Note that in the present embodiment, although the case with the number of receivable antennas Nrx being 1 (i.e. the case of the MISO system) has been described, the present invention is equally applicable to cases with the number of receivable antennas Nrx being 2 or more (i.e. cases of the MIMO system). In this case, in ST202 shown in FIG. 10, radio receiving apparatus 200 calculates the transmission weights (W(t) and W(s)) respectively corresponding to the receiving antennas of the number of receivable antennas Nrx, and in ST203, the transmission weights (W(t) and W(s)) of the number of receivable antennas Nrx are fed back.

Figure 12:
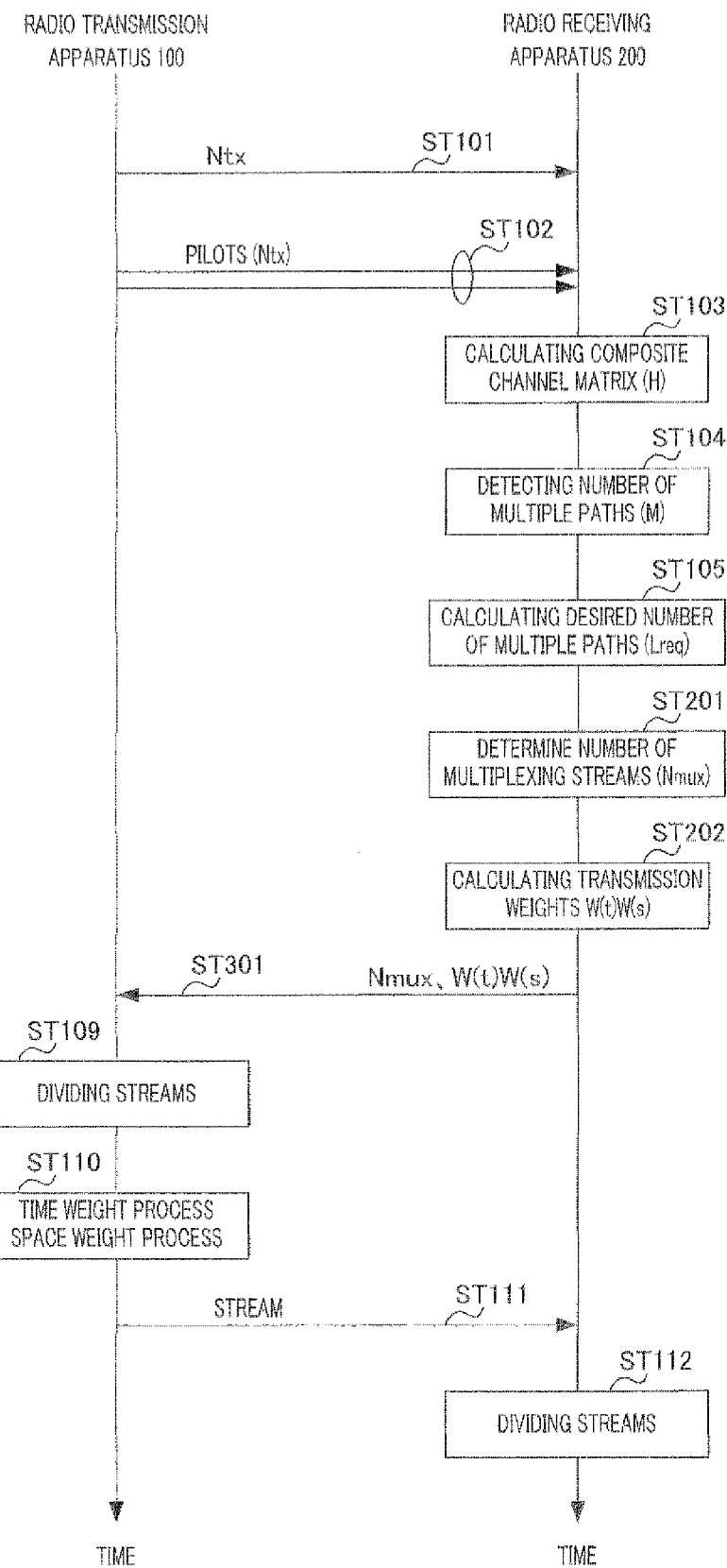
FIG. 12 is a sequence diagram showing procedures of another precoding process of Embodiment 2 of the present invention.

Further, in the present embodiment, although the case in which radio receiving apparatus 200 feeds back the desired number of multiple paths Lreq (ST203 shown in FIG. 10) has been described, the number of multiplexing streams Nmux may be fed back instead of Lreq. Specifically, as shown in FIG. 12, in ST301, radio receiving apparatus 200 feeds back the number of multiplexing streams Nmux and the transmission weights (W(t) and W(s)) to radio transmission apparatus 100. In this case, radio receiving apparatus 200 may feed back the number of multiplexing streams Nmux and the transmission weights (the space precoding matrix W(s) and the time precoding matrix W(t)) using PMI shown in FIG. 13.

Embodiment 3

In the present embodiment, the radio receiving apparatus feeds back transmission weights in which both the space precoding matrix and the time precoding matrix are totaled to the radio transmission apparatus.

Figure 14:
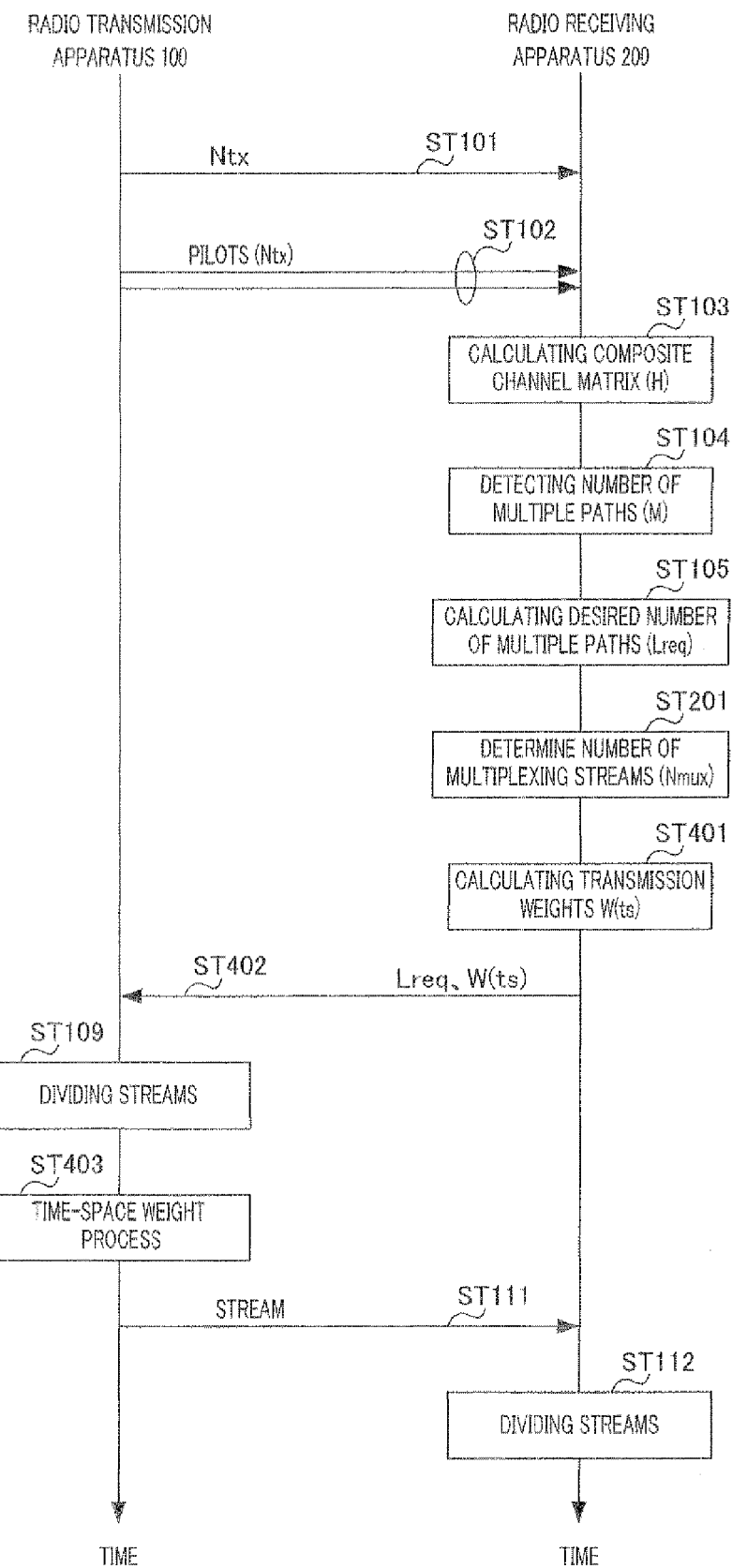
FIG. 14 is a sequence diagram showing procedures of a precoding process of Embodiment 3 of the present invention.

Hereinafter, a specific description will be made. FIG. 14 is a sequence diagram showing the procedures of the precoding process of the present embodiment. Note that, in FIG. 14, parts in common with FIG. 10 are given the same reference signs as in FIG. 10, and the detailed description thereof will not be repeated here.

As shown in FIG. 14, in ST401, radio receiving apparatus 200 of the present embodiment calculates the transmission weights (W(ts)) of the space domain and the time domain based on the desired number of multiple paths Lreq calculated in ST105, the number of multiplexing streams Nmux determined in ST201 and the composite channel matrix H calculated in ST103. For example, the transmission weights (W(ts)) are transmission weights represented by a matrix constituted from the transmission weights in the time domain and the transmission weights in the space domain.

In ST402, radio receiving apparatus 200 feeds back the desired number of multiple paths Lreq and the transmission weights (W(ts)) to radio transmission apparatus 100 of the present embodiment.

In ST403, radio transmission apparatus 100 performs precoding (time space weight process) on the streams using the transmission weights W(ts) fed back in ST402.

As described above, according to the present embodiment, even in the case where the radio receiving apparatus feeds back the transmission weights (time space weights) in which the space precoding matrix and the time precoding matrix are totaled to the radio transmission apparatus, a similar effect to that of Embodiment 1 can be obtained.

Further, in the present embodiment, by having the radio receiving apparatus perform the conventional multipath dividing process and the space dividing process on the receiving signals received from the radio transmission apparatus, the transmission weights are controlled to maintain the receiving power (receiving quality) of each stream constant without any excess or deficiency. That is, the radio receiving apparatus simply needs to perform the conventional multipath separating process and the space separating process on the receiving signals.

Note that, in the present embodiment, although the case with the number of receivable antennas Nrx being 1 (i.e. the case of the MISO system) has been described, the present invention is equally applicable to cases with the number of receivable antennas Nrx being 2 or more (i.e. cases of the MIMO system). In this case, in ST401 shown in FIG. 14, radio receiving apparatus 200 calculates the transmission weights (W(ts)) respectively corresponding to the receiving antennas of the number of receivable antennas Nrx, and in ST402, the transmission weights (W(ts)) of the number of receivable antennas Nrx are fed back.

Embodiment 4

In the present embodiment, a case of a mobile communication system which is a communication system using TDD (Time Division Duplex) scheme will be described.

In the case of the mobile communication system being the communication system using the TDD scheme, a correlation between a transmission path characteristic from the radio receiving apparatus to the radio transmission apparatus and a transmission path characteristic from the radio transmission apparatus and the radio receiving apparatus is extremely high. Thus, the radio transmission apparatus can detect the channel information estimated in the radio receiving apparatus from the channel information of the signals from the radio receiving apparatus without any feedback.

Figure 15:
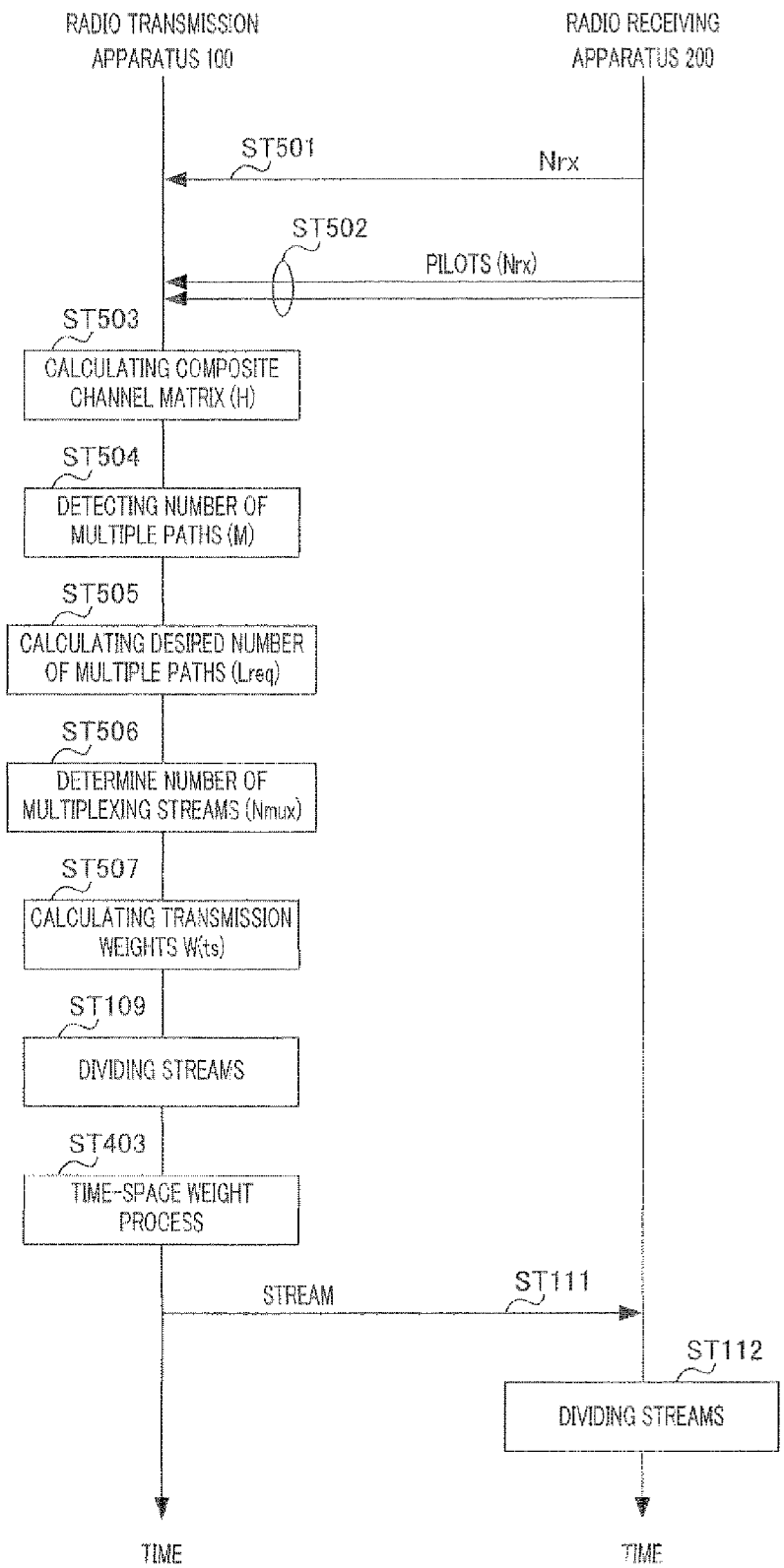
FIG. 15 is a sequence diagram showing procedures of a precoding process of Embodiment 4 of the present invention.

Hereinafter, a specific description will be made on the present embodiment. FIG. 15 is a sequence diagram showing the procedures of the precoding process of the present embodiment. Note that, in FIG. 15, parts in common with FIG. 14 are given the same reference signs as in FIG. 14, and the detailed description thereof will not be repeated here.

As shown in FIG. 15, in ST501, radio receiving apparatus 200 of the present embodiment transmits the number of receivable antennas Nrx to radio transmission apparatus 100 of the present embodiment.

In ST502, radio receiving apparatus 200 transmits the pilots for each of antennas 201-1 to 201-Nrx (i.e. Nrx pilots) to radio transmission apparatus 100.

In ST503 to ST507, radio transmission apparatus 100 performs processes similar to ST103 to 105, 201, 401 of radio receiving apparatus 200 of Embodiment 3 using the number of receivable antennas Nrx obtained in ST501 and the pilots obtained in ST502. That is, radio transmission apparatus 100 detects the channel information (channel matrix H) from radio transmission apparatus 100 to radio receiving apparatus 200 based on the pilots obtained in ST502 (ST503), detects the number of multiple paths based on the channel information (ST504), and further, orderly calculates the desired number of multiple paths Lreq, the number of multiplexing streams Nmux and the transmission weights W(ts) (ST505 to 507).

That is, radio transmission apparatus 100 does not need the feedback information (e.g. ST402 shown in FIG. 14) from radio receiving apparatus 200.

Consequently, according to the present embodiment, in the case with the communication system using the TDD scheme, a similar effect to that of Embodiment 1 can be obtained without any feedback from the radio receiving apparatus to the radio transmission apparatus.

Further, in the present embodiment, by having the radio receiving apparatus perform the conventional multipath separating process and the space separating process on the receiving signals received from the radio transmission apparatus, the transmission weights are controlled to maintain the receiving power (receiving quality) of each stream constant without any excess or deficiency. That is, the radio receiving apparatus simply needs to perform the conventional multi-path separating process and the space separating process on the receiving signals similar to Embodiment 3.

Embodiments of the present invention have been described in the above.

Figure 16:
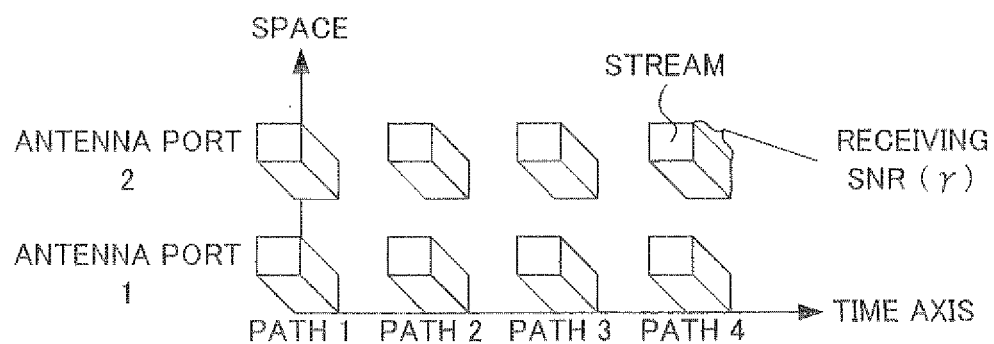
FIG. 16A shows a stream distribution of a variation of the present invention.
FIG. 16B a diagram showing another stream distribution of the variation of the present invention.
Figure 16:
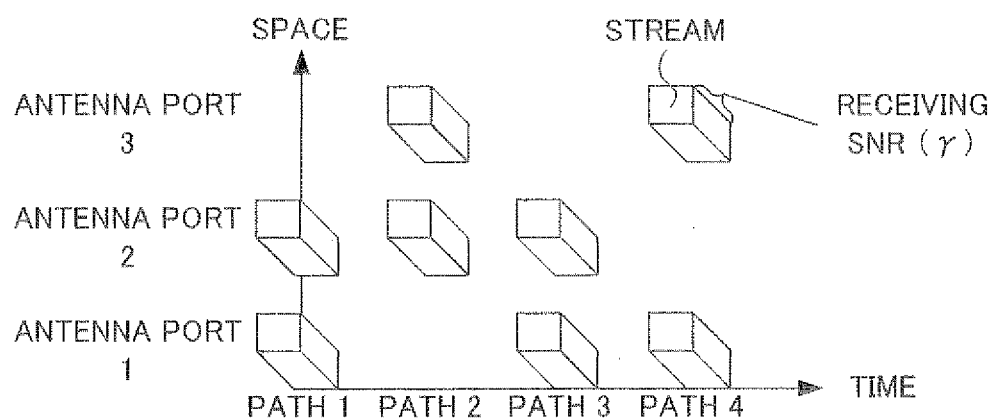

Note that, in the above embodiment, the case of determining a product of the number of multiple paths and the number of receivable antenna ports as the number of multiplexing streams has been described. However, in the present invention, the number of multiplexing streams is not limited to the product of the number of multiple paths and the number of receivable antenna ports. That is, in the present invention, it is not necessary for the respective streams to be independently and orthogonally multiplexed in all of the spaces, iii total of NrxxLreq (=8), of the two-dimension of the space domain (e.g. the number of receiving antenna ports Nrx=2) and the time domain (e.g. the number of multiple paths Lreq=4), for example, as shown in FIG. 16A. In the present invention, in the receiving signal channel space represented by the two-dimension of the time domain and the space domain, the transmission weights by which the receiving power (receiving SNR) of all of the streams is set at $\gamma$ (or $\gamma_{qpsk}$) simply needs to be calculated. Thus, for example, as shown in FIG. 16B, the streams do not need to be present in all of the spaces, in total of NrxxLreq (=12), of the two-dimension of the space domain (e.g. the number of receiving antenna ports Nrx=3) and the time domain (e.g. the number of multiple paths Lreq=4). That is, as shown in FIG. 16B, even in the case where the 8 streams similar to FIG. 16A are sparsely distributed in the space domain and the time domain, a similar effect to that of the above embodiments can be obtained.

Further, although the above embodiment has been described using antennas, the present invention may similarly be adapted to antenna ports.

An antenna port means a logical antenna comprised of one or more physical antennas. That is, the antenna port may not necessarily refer to one physical antenna, and may refer to an array antenna, etc., comprised of a plurality of antennas.

For example, in 3GPP-LTE, it is not defined as to by how many physical antennas an antenna port is constituted, and it is defined as a minimum unit by which a base station can transmit different reference signals.

Further, the antenna port may be defined as a minimum unit of multiplying a weighting of a precoding vector.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system. LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-041266, filed on Feb. 24, 2009. including the specification, drawings and abstract, is incorporated herein by reference in its entirety.

INDUSTRIAL APPLICABILITY

The present invention is equally applicable to a mobile communication system, etc.

The invention claimed is:

1. A radio transmission apparatus for transmitting a plurality of spatial multiplexing streams to a radio reception apparatus, the radio transmission apparatus comprising:
   a determining section configured to determine the number of spatial multiplexing streams based on a desired number of multiple paths and the number of receiving antenna ports of the radio reception apparatus, the number of spatial multiplexing streams being a product of the desired number of multiple paths and the number of receiving antenna ports, the desired number of multiple paths being a number of multiple paths by which a received power of each of the plurality of streams satisfies a desired error rate of the plurality of streams in a fixed modulation scheme;
   a dividing section configured to divide transmission data into the determined number of spatial multiplexing streams;
   a calculating section configured to calculate transmission weights based on the desired number of multiple paths, the determined number of spatial multiplexing streams and a channel estimation value; and
   a precoding section configured to perform a precoding on the determined number of streams using the calculated transmission weights.

2. The radio transmission apparatus according to claim 1, wherein:
   the fixed modulation scheme is QPSK modulation; and
   the determining section is configured to determine the number of spatial multiplexing streams based on the desired number of multiple paths calculated based on the desired error rate in the QPSK modulation.

3. The radio transmission apparatus according to claim 1, wherein the calculating section is configured to calculate the transmission weights by which the plurality of streams are received by the radio reception apparatus in the desired number of multiple paths.

4. The radio transmission apparatus according to claim 1, wherein the calculating section is configured to calculate the transmission weights represented by a matrix composed of weights on a time axis and weights on a space axis.

5. The radio transmission apparatus according to claim 1, further comprising a processor including the determining section, the dividing section, the calculating section and the precoding section.

6. A precoding method, the method performed by a processor, comprising:
- calculating a desired number of multiple paths based on a detected number of multiple paths, the number of receiving antenna ports and a desired error rate of a plurality of spatial multiplexing streams;
- determining the number of spatial multiplexing streams based on the desired number of multiple paths and the number of receiving antenna ports, the number of spatial multiplexing streams being a product of the desired number of multiple paths and the number of receiving antenna ports, the desired number of multiple paths being a number of multiple paths by which a received power of each of the plurality of streams satisfies a desired error rate of the plurality of streams in a fixed modulation scheme;
- dividing transmission data into the determined number of spatial multiplexing streams;
- calculating transmission weights based on the desired number of multiple paths, the determined number of spatial multiplexing streams and a channel estimation value; and
- performing a precoding on the determined number of streams using the calculated transmission weights.

* * * * *